United States Patent
Bolotski et al.

(10) Patent No.: US 8,994,587 B2
(45) Date of Patent: Mar. 31, 2015

(54) COMPRESSED SENSING FOR NAVIGATION DATA

(75) Inventors: Josephine A. Bolotski, Seattle, WA (US); Douglas Neal Rowitch, Del Mar, CA (US); Mark Leo Moeglein, Ashland, OR (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 12/780,329

(22) Filed: May 14, 2010

(65) Prior Publication Data

US 2011/0279324 A1    Nov. 17, 2011

(51) Int. Cl.
*G01S 19/03* (2010.01)
*G01S 19/42* (2010.01)
*G01S 3/02* (2006.01)
*G01S 19/36* (2010.01)
*G01S 19/30* (2010.01)

(52) U.S. Cl.
CPC ... *G01S 19/36* (2013.01); *G01S 19/30* (2013.01)
USPC ............... 342/357.4; 342/357.25; 342/451

(58) Field of Classification Search
CPC ......... G01S 19/03; G01S 19/30; G01S 19/36; G01S 19/42
USPC ............ 342/357.25, 357.4, 357.49, 451, 453; 701/207, 214, 468
See application file for complete search history.

(56) References Cited

U.S. PATENT DOCUMENTS

| | | | | |
|---|---|---|---|---|
| 4,862,292 A | * | 8/1989 | Enari et al. | 360/8 |
| 4,907,081 A | * | 3/1990 | Okamura et al. | 375/240.01 |
| 5,070,395 A | * | 12/1991 | Kitaura et al. | 348/445 |
| 5,365,274 A | * | 11/1994 | Seki et al. | 348/458 |
| 5,612,748 A | * | 3/1997 | Gohshi et al. | 375/240.21 |
| 5,663,734 A | | 9/1997 | Krasner | |
| 5,781,156 A | | 7/1998 | Krasner | |
| 2001/0009407 A1 | | 7/2001 | Honda et al. | |
| 2006/0208943 A1 | | 9/2006 | Gronemeyer | |
| 2008/0218401 A1 | | 9/2008 | Loomis et al. | |
| 2011/0231155 A1 | * | 9/2011 | Hershey et al. | 702/187 |

FOREIGN PATENT DOCUMENTS

| | | |
|---|---|---|
| CN | 1366615 A | 8/2002 |
| CN | 101147081 A | 3/2008 |
| JP | H03297234 A | 12/1991 |
| JP | 2004301838 A | 10/2004 |
| JP | 2008160689 A | 7/2008 |
| JP | 2008533499 A | 8/2008 |
| WO | WO 0163316 A1 | 8/2001 |
| WO | WO-2006102033 A1 | 9/2006 |

OTHER PUBLICATIONS

Blumensath, et al., "Gradient Pursuits," IEEE Trans. on Signal Processing, 56(6), pp. 2370-2382, Jun. 2008.
Blumensath, et al., "Iterative Thresholding for Sparse Approximations," Preprint, 2007.

(Continued)

*Primary Examiner* — Dao Phan
(74) *Attorney, Agent, or Firm* — Jennifer M. Pascua (57) ABSTRACT

Methods, apparatuses, and systems are provided for processing positioning signals to obtain navigation information by applying compressed sensing.

42 Claims, 6 Drawing Sheets

(56) References Cited

OTHER PUBLICATIONS

Candes, et al., "Compressive Sampling," Int. Congress of Mathematics, 3, pp. 1433-1452, Madrid, Spain, 2006.
Rao, et al., "An Affine Scaling Methodology for Basis Selection," IEEE Trans. on Signal Processing, 47, pp. 187-200, Jan. 1999.
Tropp, et al., "Signal Recovery From Random Measurements Via Orthogonal Matching Pursuit," IEEE Trans. on Information Theory, 53(12), pp. 4655-4666, Dec. 2007.
Kusuma J et al: "Sampling with finite rate of innovation: Channel and timing estimation for UWB and GPS", New Frontiers in Telecommunications : 2003 IEEE International Conference on Communications ; ICC 2003; May 11-15, 2003, Anchorage, Alaska, USA; [IEEE International Conference on Communications], IEEE Operations Center, Piscataway NJ vol. 5, May 11, 2003, pp. 3540-3544, XP010643103, DOI: DOI:10.1109/ICC.2003.1204112 ISBN: 978-0-7803-7802-5.
Pany, et al., "Performance assessment of an under sampling SWC receiver for simulated high-bandwidth GPS/Galileo signals and real signals," Proceedings of ION CPS/GNSS 2003, Sep. 9, 2003, pp. 103-116.
Partial International Search Report—PCT/US2011/036502, International Searching Authority, European Patent Office, Dec. 1, 2011.
Qian, et al., "The research of acquiring BOC signal in navigation system," 2010 Second International Conference on Networks Security, Wireless Communications and Trusted Computing (NSWCTC), IEEE, Piscataway, NJ, USA, Apr. 24, 2010, pp. 3-6.
International Search Report and Written Opinion—PCT/US2011/036502—ISA/EPO—May 21, 2012.

* cited by examiner

COMPRESSED SENSING FOR NAVIGATION DATA

BACKGROUND

1. Field

The subject matter disclosed herein relates to electronic devices, and more particularly to methods, apparatuses, and systems for use in and/or with navigation enabled devices.

2. Information

Wireless communication networks provide connectivity among both fixed and mobile computing platforms to facilitate sharing of information. A popular and increasingly important wireless technology includes navigation systems, and in particular those that are enabled for use with a satellite positioning system (SPS) that includes, for example, the global positioning system (GPS) and/or other like Global Navigation Satellite Systems (GNSSs). Positioning signals that are received by a navigation enabled device from one or more transmitting orbiting satellites and/or terrestrial based transmitting stations may be processed to determine a corresponding position (e.g., geographic location and/or altitude) of the navigation enabled device from which orientation, path of travel, velocity, and/or acceleration information may also be obtained.

In addition, information in the form of electronic data continues to be generated or otherwise identified, collected, stored, shared, and analyzed. Such electronic data may take the form of media content such as images, videos, audio, textual content, and software, for example. Some navigation enabled devices may further incorporate the capability to capture and share such media content with other computing platforms via communication networks. As one example, the World Wide Web provided by the Internet continues to grow with seemingly continual addition of new information.

SUMMARY

Implementations relating to processing of positioning signals are disclosed. In one implementation, a method is provided that comprises sampling a positioning signal received at a navigation enabled device according to a sub-Nyquist sampling rate to obtain a compressed sampling. The method may further comprise storing the compressed sampling at a storage medium and/or initiating reconstruction of the positioning signal from the compressed sampling to obtain navigation information indicated by the positioning signal. It will be appreciated that this summary merely describes an example implementation, and that claimed subject matter is not limited to this particular implementation.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

One principle of signal processing maintains that a signal, such as a positioning signal, should be sampled at a Nyquist sampling rate, which may be defined as a minimum sampling rate applied in sampling a band limited signal needed to recover all information in the band limited signal, which is twice the bandwidth of the band limited signal. Data obtained by sampling a signal at or above a Nyquist sampling rate is often subsequently compressed to reduce data size. The application of signal compression after sampling is recognized as a trade-off between signal complexity (e.g., data size) and tolerance for signal error. Therefore, such post-sampling compression may be wasteful of processing resources.

As an alternative to sampling at a Nyquist rate, signals such as positioning signals may be processed by applying what may be referred to as "compressed sensing", "compressive sensing", "compressive sampling", or "compressed sampling" in which a signal may be sampled and also compressed at a reduced sub-Nyquist sampling rate (i.e., a sampling rate that is less than a Nyquist sampling rate for a given signal). Such compressed sensing techniques may be particularly effective for signals that are sparse in a particular domain which includes, for example, positioning signals received from navigation systems.

Accordingly, implementations relating to processing of positioning signals by applying compressed sensing are disclosed. In at least some implementations disclosed herein, compressed sensing may be applied to positioning signals received at a receiver (e.g., residing at a navigation enabled device) by sampling the positioning signals at a sub-Nyquist sampling rate to obtain a compressed sampling. The positioning signals may be subsequently reconstructed from the compressed sampling to obtain navigation information indicated by the sampled positioning signals. Such navigation information may include and/or indicate, for example, a position (e.g., geographic location and/or altitude), an orientation, a path of travel, and/or a state of motion (e.g., velocity and/or acceleration) of a navigation enabled device. Compressed samplings may, for example, be stored for subsequent reconstruction of positioning signals, associated with media content for purposes of geotagging, and/or transmitted to remote computing resources via wireless communication networks for processing. Remote processing of compressed samplings may allow for a reduced signal processing burden at navigation enabled devices. Such compressed samplings may also reduce network burden otherwise associated with the transmission of data signals that are obtained by application of sampling rates that are equal to or in excess of a Nyquist sampling rate.

Figure 1:
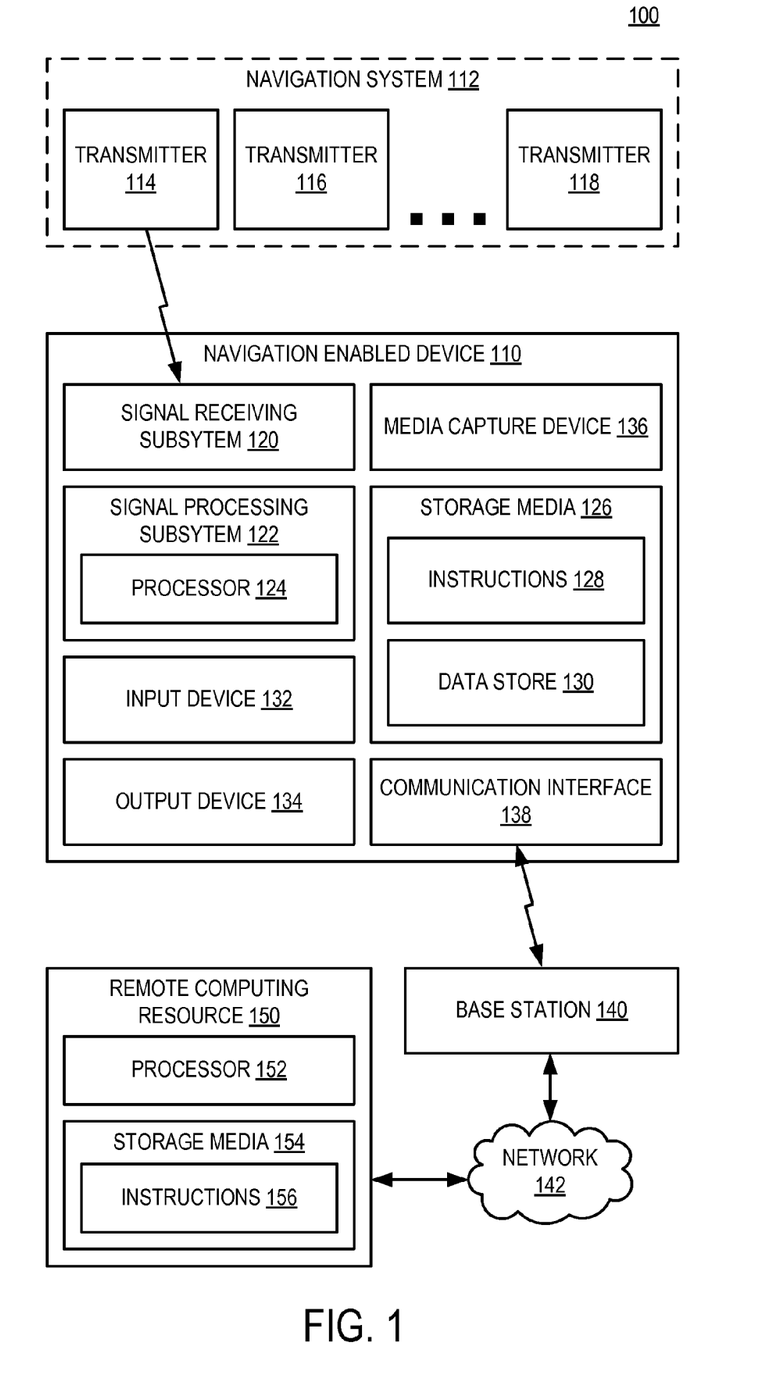
FIG. 1 is a schematic block diagram of an example network environment according to one implementation.

FIG. 1 is a schematic block diagram of an example network environment 100 according to one implementation. Network environment 100 may include a navigation enabled device 110 that may receive positioning signals from a navigation system 112. Such positioning signals may comprise bandlimited signals that may be transmitted as radio waves, for example. Such received positioning signals may be processed by or on behalf of navigation enabled device 110 to obtain positioning information that includes and/or indicates, for example, one or more of a position (e.g., geographic location and/or altitude), an orientation, a path of travel, and/or a state of motion (e.g., velocity and/or acceleration) of navigation enabled device 110.

Navigation system 112 may comprise any suitable navigation system, and may include a Satellite Positioning System (SPS) and/or a terrestrial based positioning system. Satellite positioning systems may include, for example, Global Positioning System (GPS), Galileo, GLONASS, NAVSTAR, GNSS, a system that uses satellites from a combination of these systems, or any SPS developed in the future. As used herein, an SPS will also be understood to include pseudolite systems. Terrestrial based positioning systems may include wireless cellular networks and WIFI networks, among other suitable wireless communication networks. At least some terrestrial based positioning systems may utilize, for example, a trilateration based approach for identifying navigation information including and/or indicating, for example, a position, orientation, path of travel, and/or state of motion of a navigation enabled device. Such trilateration may include Advanced Forward Link Trilateration (AFLT) in CDMA or Enhanced Observed Time Difference (EOTD) in GSM or Observed Time Difference of Arrival (OTDOA) in WCDMA, which measures at a navigation enabled device the relative times of arrival of signals transmitted from each of several transmitter equipped base stations.

Accordingly, navigation system 112 may include a number of transmitters 114, 116, 118, etc. to transmit one or more positioning signals that may be received by navigation enabled device 110. Transmitters 114, 116, 118, etc. may be deployed at one or more orbiting satellites for SPS navigation system implementations and/or one or more terrestrial based transmission stations (e.g., base stations) for terrestrial based navigation system implementations. It will be appreciated that navigation system 112 may include any suitable number of transmitters. For example, in the context of a GPS based SPS navigation system, four or more (e.g., including up to at least twelve) satellite based transmitters may be concurrently utilized by navigation enabled device 110 to obtain navigation information indicated by one or more positioning signals received from such transmitters.

Navigation enabled device 110 may comprise any suitable electronic device that enables or provides navigation information services (e.g., device positioning, etc.). Non-limiting examples of suitable electronic devices include a mobile computing device or computing platform such as a cellular phone, a smart phone, a personal digital assistant, a low duty cycle communication device, a laptop computer, or a personal or vehicular based navigation unit, among other examples or combinations thereof. In other examples, navigation enabled device 110 may take the form of one or more integrated circuits, circuit boards, and/or the like that may be operatively enabled for use in another device.

Navigation enabled device 110 may include a signal receiving subsystem 120 for receiving positioning signals from the one or more transmitters (e.g., transmitters 114, 116, 118, etc.) of navigation system 112. For example, signal receiving subsystem 120 may include at least a radio frequency receiver for receiving wireless positioning signal transmissions from one or more satellite and/or terrestrial based transmitters of navigation system 112. Received positioning signals may be transmitted by navigation system 112 to navigation enabled device 110 according to any suitable transmission protocol including, for example, GPS, Galileo, GLONASS, WIFI, WiMAX, Bluetooth, CDMA, GSM, WCDMA, etc. Hence, it will be appreciated that the various implementations described herein are not limited in application to a particular transmission protocol.

Navigation enabled device 110 may include a signal processing subsystem 122 for processing, at least in part, positioning signals received from navigation system 112. In at least some implementations, signal processing subsystem 122 may include one or more processors (e.g., digital signal processors, microprocessors, etc.) such as processor 124. As one example, processor 124 may be adapted to execute instructions to perform at least some of the methods, operations, and processes described herein with respect to the following figures. Such instructions may be stored or held in storage media 126 as instructions 128. It will be appreciated that signal processing subsystem 122 may alternatively or additionally include other suitable electronic components beyond processor 124.

A non-limiting example of signal processing subsystem 122 is described in greater detail with reference to FIG. 2. Briefly, however, signal processing subsystem 122 may be adapted to sample a positioning signal received at signal receiving subsystem 120 according to a sub-Nyquist sampling rate to obtain a compressed sampling. In at least some implementations, such a compressed sampling may comprise a random sampling of the positioning signal received at the navigation enabled device. A compressed sampling in this context may be used to at least partially reconstruct a positioning signal to obtain navigation information represented by the positioning signal including, for example, a position of a receiver of the signal receiving subsystem 120. Signal processing subsystem 122 may be further adapted to store the compressed sampling in data store 130 of storage media 126 where it may be retrieved for subsequent reconstruction of positioning signals. In at least some implementations, signal processing subsystem 122 may be adapted to reconstruct a positioning signal locally at the navigation enabled device from a compressed sampling. Alternatively, signal processing subsystem 122 may be adapted to initiate transmission of a compressed sampling to a remote computing resource for reconstruction of a positioning signal.

Figure 4:
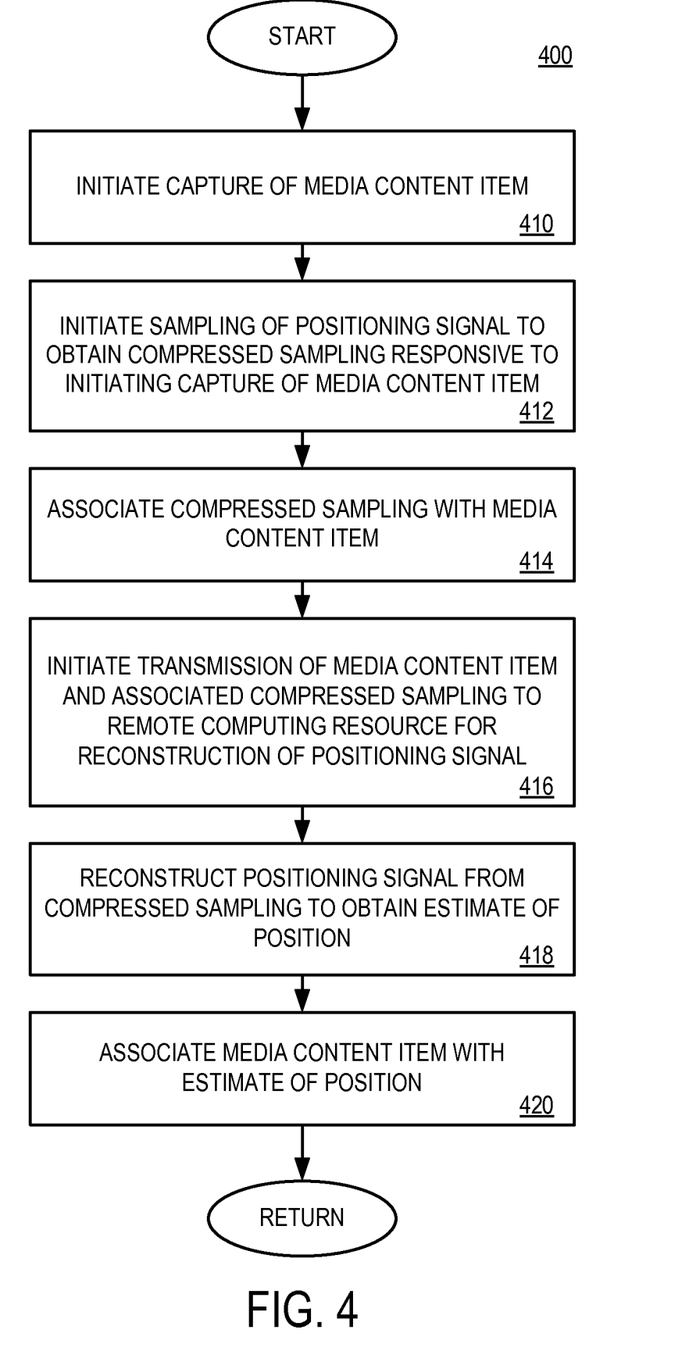
FIG. 4 is a flow diagram illustrating an example process for associating a compressed sampling with a media content item according to one implementation.

Navigation enabled device 110 may include a media capture device 136 for capturing media content items. Non-limiting examples of media capture device 136 include, for example, a camera (e.g., for capturing dynamic video and/or static images), a microphone for capturing audio content, and/or a keypad for capturing textual content. Accordingly, media content items captured by media capture device 136 may include images, videos, audio, and/or textual content to name just a few examples. Such captured media content items may be stored at data store 130 of storage media 126. It will be appreciated that media content items may be stored as encoded and/or compressed digital data files. Such digital data files may include, for example, the .jpeg format for image files, the .mpeg format for video files, the .mp3 format for audio files, and the .txt format for textual files to name just a few non-limiting examples. As will be described in greater detail with reference process 400, signal processing subsystem 122 may be further adapted to associate compressed samplings that indicate navigation information with stored media content items to provide what may be referred to as geotagging of the media content items. Geotagging of media content items may include associating navigation information with a media content item that indicates, for example, a position where the media content item was captured or modified via the navigation enabled device.

A human operator (i.e., user) may interact with navigation enabled device 110 via one or more input devices and/or output devices. For example, navigation enabled device 110 may include an input device 132 that comprises one or more of a keyboard, a keypad, a touch-sensitive button, a mouse, a controller, a touch-sensitive graphical display (e.g., a touch screen), a microphone, or other suitable device for receiving user input. Navigation enabled device 110 may further include an output device 132 comprising one or more of a graphical display, an audio speaker, a haptic feedback device, or other suitable device for outputting (e.g., presenting) information to a user. It will be appreciated that in some implementations, a common element may serve as both an input device 132, an output device 134, and/or a media capture device 136. For example, navigation enabled device 110 may include a touch-sensitive graphical display for presenting a graphical keypad. Such a touch-sensitive graphical display may serve multiple functions as an input device, an output device, and a media capture device for capturing media content items (e.g., textual content).

Navigation enabled device 110 may communicate with other communication networks via communication interface 138. As a non-limiting example, communication interface 138 comprises a wireless transceiver for communicating wirelessly with network 142 via base station 140. It will be appreciated that navigation enabled device 110 may communicate with base station 140 via communication interface 138 using any suitable communication protocol supported by a common network including, for example, communication protocols supported by WIFI, WiMAX, Bluetooth, CDMA, GSM, and WCDMA, to name just a few non-limiting examples. However, in other examples, navigation enabled device 110 may communicate with network 142 via wired communication. For example, base station 140 may instead comprise a docking station or other suitable interface for facilitating wired or wireless communication between navigation enabled device 110 and network 142.

Network 142 may facilitate communication among a variety of network clients. For example, network 142 may facilitate communication between navigation enabled device 110 and a remote computing resource 150 (e.g., a network server or other suitable computing platform). Network 142 may comprise one or more wide area networks (e.g., the Internet), local area networks (e.g., an intranet), and/or personal area networks. It will be appreciated that network 142 may support any suitable communication protocol, including the TCP/IP Internet protocol suite. Further it will be appreciated that the communication protocol for network 142 may differ from the communication protocol used by navigation system 112 to communicate wirelessly with navigation enabled device 110 and/or the communication protocol used by navigation enabled device 110 to communicate with base station 140. However, in other implementations, navigation system 112 and clients of network 142 (e.g., such as remote computing resource 150) may communicate with navigation enabled device 110 via a common communication network and/or associated communication protocol. For example, signal receiving subsystem 120 and communication interface 138 may share common elements for facilitating communication with a variety of network components. Furthermore, in at least some implementations, network 142 and base station 140 may be omitted, whereby remote computing resource 150 may comprise a computing platform that is capable of communicating directly with navigation enabled device 110, for example, via wired communication (e.g., via docking) or wireless communication (e.g., via a personal area network).

Remote computing resource 150 may include a processor 152 to execute instructions and a storage media 154 having instructions 156 stored thereon that are executable by processor 152 to perform at least some of the methods, operations, and processes described herein. For example, instructions 156 may be executable by processor 152 to obtain a media content item having a media component and a compressed sampling component. The compressed sampling component may comprise a sub-Nyquist sampling of one or more positioning signals which may be employed in obtaining navigation information such as a position, for example, of navigation enabled device 110. Instructions 156 may be executable by processor 152 to process the compressed sampling component to obtain such navigation information. Furthermore, instructions 156 may be executable by processor 152 to associate the navigation information (e.g., obtained from the compressed sampling component) with the media component of the media content item. Such association may be used to provide geotagging of media content items with navigation information indicated by the reconstructed positioning signals from the compressed samplings.

Figure 2:
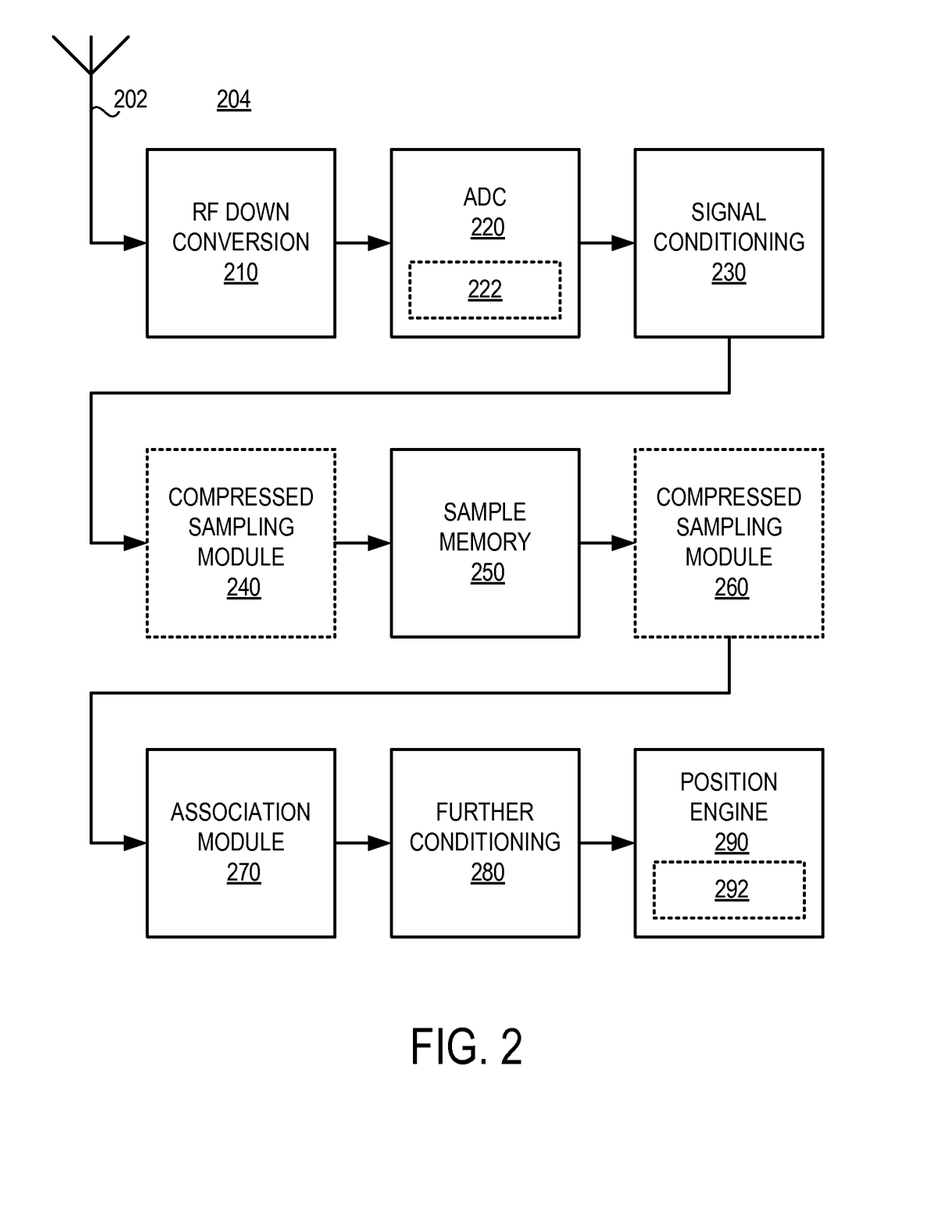
FIG. 2 is a schematic block diagram of an example signal processing subsystem for processing positioning signals according to one implementation.

FIG. 2 is a schematic block diagram of an example signal processing subsystem 204 for processing positioning signals according to one implementation. It will be appreciated that signal processing subsystem 204 may comprise various components 210-290, which may include one or more of hardware, software, and/or firmware. As one example, signal processing subsystem 204 may refer to the previously described signal processing subsystem 122 of FIG. 1.

Radio frequency (RF) down conversion may be performed at block 210 for positioning signals received via antenna 202. As one example, antenna 202 is representative of a component of signal receiving subsystem 120 of FIG. 1. Next, analog to digital conversion (ADC) of the positioning signals from an analog state to a digital state may be performed at block 220, for example, by an analog to digital converter.

In at least some implementations, analog to digital conversion of positioning signals received at block 220 may be accompanied by compressed sampling performed by a compressed sampling module 222 of the analog to digital converter. In such implementations, a signal output of the analog to digital converter may comprise a digital compressed sampling that is based, at least in part, on an analog signal input received via antenna 202.

As one example, an analog compressed sampling may be obtained at block 220 by sampling an analog signal received via antenna 202 at a sub-Nyquist sampling rate prior to converting the analog compressed sampling to a digital compressed sampling. Hence, in this particular example, analog to digital conversion may be performed after obtaining a compressed sampling of an input analog signal.

As another example, a digital sampling may be obtained at block 220 by converting an analog signal received via antenna 202 from an analog state to a digital state at a sub-Nyquist sampling rate prior to obtaining a digital compressed sampling. Hence, in this particular example, analog to digital conversion may be performed before obtaining a compressed sampling of the digital signal.

As yet another example, an analog sampling may be obtained at block 220 by sampling an analog signal received via antenna 202 at a Nyquist sampling rate or at a higher rate than a Nyquist sampling rate prior to converting the analog sampling to a digital sampling. Compressed sampling at a sub-Nyquist sampling rate may then be performed on the digital sampling that was obtained at a Nyquist or higher sampling rate to subsequently obtain a digital compressed sampling. Hence, in this particular example, sampling of an analog signal at a Nyquist or higher sampling rate may be performed prior to analog to digital conversion upon which compressed sampling may then be performed.

In each of the above examples, compressed sampling of a signal, whether digital or analog, may be performed by a compressed sampling module (e.g., compressed sampling module 222) according to a compressed sampling algorithm. Signal samples that are converted to the digital domain from the analog domain may be selected by a compressed sampling module at random from the digital domain or may be selected according to some other suitable compressed sampling algorithm. For example, compressed samplings may be obtained from positioning signals by utilizing non-random sampling that is performed at a fixed rate or according to a defined rate function in at least some implementations.

In other implementations, compressed sampling may be performed at other points or locations in the signal processing workflow. Hence, compressed sampling as performed by compressed sampling module 222 may be omitted from the analog to digital converter and the associated analog to digital conversion process in some implementations. Accordingly, in such implementations, an output of block 220 may comprise an uncompressed digital signal.

Continuing with FIG. 2, signal conditioning may be performed at block 230 on digital signals output by block 220. Such digital signals may comprise compressed signals in implementations where compressed sampling module 222 is implemented at block 220 or may comprise uncompressed digital signals where compressed sampling is not performed at block 220. Signal conditioning may include any suitable conditioning of input digital signals including, for example, signal filtering, signal decimation, signal balancing, in-phase and quadrature modulation, etc. Such signal conditioning may be performed before and/or after compressed sampling is performed in order to further condition a compressed sampling or an uncompressed digital signal to thereby improve sampling, reconstruction of positioning signals, storage, and/or transmission of that compressed sampling or uncompressed digital signal. Signal conditioning at block 230 may be omitted in some implementations, such as where signal conditioning is instead performed at block 280.

At compressed sampling module 240, compressed sampling may be performed on uncompressed digital signals that have been conditioned at block 230. However, where compressed sampling was previously performed by compressed sampling module 222 of block 220, compressed sampling module 240 may be omitted. Compressed sampling module 240 may obtain compressed samplings by application of a compressed sampling algorithm as previously described with reference to compressed sampling module 222 and as described in greater detail with reference to process flow 300 of FIG. 3. Compressed samplings obtained from compressed sampling module 222 and/or compressed sampling module 240 may be stored at sample memory 250 in some implementations. As one example, sample memory 250 may comprise a portion of data store 130 of FIG. 1. As a non-limiting example, sample memory 250 may comprise a circular buffer.

However, in some implementations, compressed sampling modules 222 and 240 may be omitted, whereby one or more positioning signals may be stored at sample memory 250 after analog to digital conversion is performed at block 220 and/or signal conditioning is performed at block 230. For example, in at least some implementations, compressed sampling may be instead performed by compressed sampling module 260 for one or more positioning signals stored at and subsequently retrieved from sample memory 250. Compressed sampling module 260 may obtain compressed samplings of positioning signals by application of a compressed sampling algorithm as previously described with reference to compressed sampling module 222 and as described in greater detail with reference to process flow 300 of FIG. 3.

In at least some implementations, compressed samplings of positioning signals may be associated with media content items by an association module 270. As one example, association module 270 may be adapted to associate a compressed sampling obtained from at least one of compressed sampling modules 222, 240, 260 with a media content item by appending the compressed sampling to the media content item as a digital tag. As another example, association module 270 may be adapted to associate a compressed sampling obtained from at least one of compressed sampling modules 222, 240, 260 with a media content item by storing the compressed sampling as metadata of the media content item (e.g., at sample memory 250).

Further, in at least some implementations, a compressed sampling of a positioning signal may be associated with additional information by association module 270 to aid in reconstruction of the positioning signal from the compressed sampling. Such additional information may include, for example, a coarse time estimate and/or a coarse position estimate, among other suitable information. As one example, association module 270 may be adapted to associate a compressed sampling with such information by appending the information to the compressed sampling as a digital tag. As another example, association module 270 may be adapted to associate a compressed sampling with such information by storing the compressed sampling in association with the additional information at sample memory 250.

Further conditioning of the compressed sampling may be performed at block 280 prior to reconstruction of the positioning signals from the compressed sampling at block 290. Signal conditioning may be performed at block 280 in a similar manner as previously described with reference to the signal conditioning performed at block 230. For example, baseband processing, signal filtering, signal decimation, and/or signal balancing may be performed in order to further condition a compressed sampling to thereby improve reconstruction of positioning signals, storage, and/or transmission of that compressed sampling.

For implementations where power consumption and/or signal processing resources are to be conserved at a navigation enabled device, signal conditioning at block 230 may be limited to processes that involve relatively lower power consumption and/or signal processing burden. When reconstruction of positioning signals from compressed samplings is to be performed (e.g., responsive to a position identification request), further conditioning may be initiated, for example, on compressed samplings stored at sample memory 250 before reconstructing positioning signals from those compressed samplings at block 290. In some implementations, further conditioning of the compressed sampling at block 280 may be performed at a remote computing resource such as remote computing resource 150 of FIG. 1 to further reduce processing burden and/or power consumption at the navigation enabled device.

A compressed sampling that is obtained from one or more of compressed sampling modules 222, 240, 260 may be processed by position engine 290 to obtain navigation information (e.g., a position) indicated by the positioning signals reconstructed from the compressed sampling. As one example, position engine 290 may include a reconstruction module 292 for reconstructing positioning signals from one or more compressed samplings to estimate a position indicated by such compressed samplings. Reconstruction module 292 may be further adapted to utilize information associated with the compressed samplings such as coarse time and position estimates to aid in reconstruction of positioning signals of such compressed samplings as will be described in greater detail with reference to process 300 of FIG. 3.

Furthermore, in at least some implementations and under select operating conditions, position engine 290 may be further adapted to process positioning signals that are conditioned at block 230 and/or stored at block 250 without undergoing compressed sampling at one or more of blocks 222, 240, 260. Hence, compressed sampling of positioning signals may not be utilized under at least some conditions to process positioning signals. For example, positioning signals may be instead sampled at Nyquist sampling rates or rates higher than Nyquist sampling rates to obtain position estimates. Furthermore, in at least some implementations, position engine 290 may reside at a remote computing resource (e.g., remote computing resource 150 of FIG. 1) rather than residing on-board a navigation enabled device. Hence, reconstruction of positioning signals from compressed samplings may entail communication (e.g., via communication network 142 of FIG. 1) between a navigation enabled device and a remote computing resource in such implementations as will be described in greater detail with reference to FIG. 3.

Figure 3:
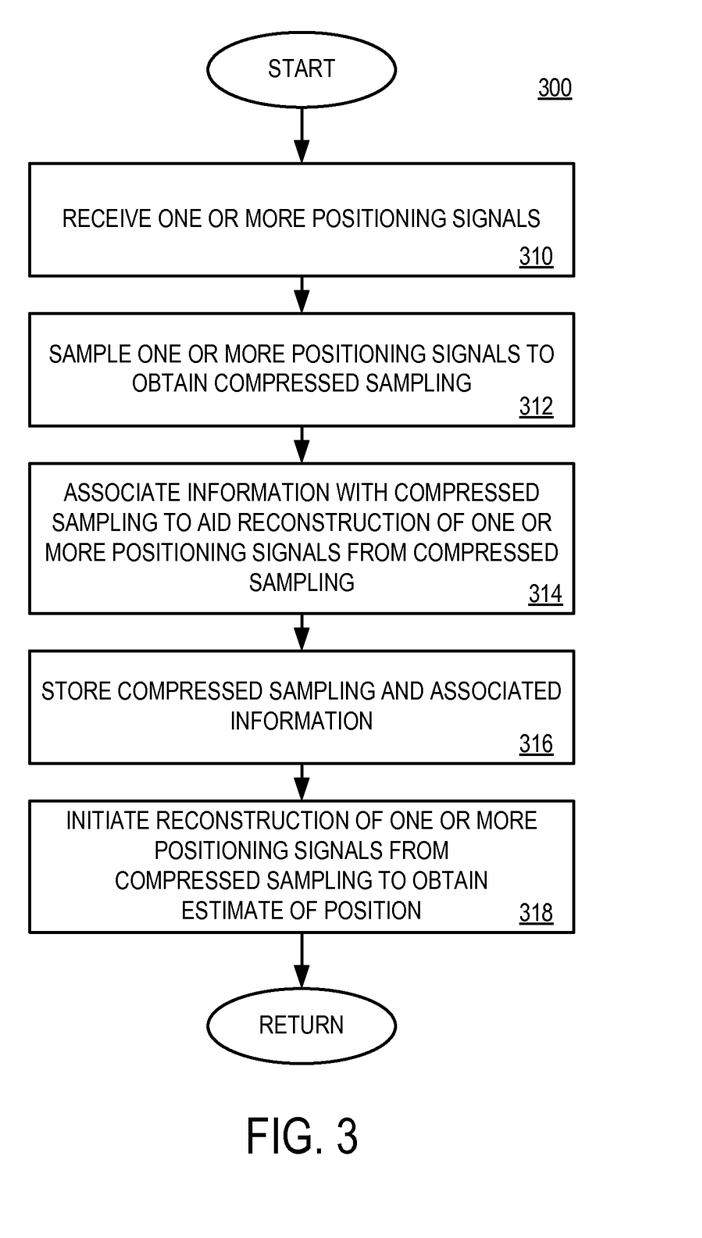
FIG. 3 is a flow diagram illustrating an example process for obtaining a compressed sampling of a positioning signal according to one implementation.

FIG. 3 is a flow diagram depicting an example process 300 for applying compressed sensing to positioning signal processing according to one implementation. In at least some implementations, process 300 may be performed, for example, at navigation enabled device (e.g., navigation enabled device 110) and/or other suitable computing platform (e.g., remote computing resource 150) by one or more processors executing instructions. While process 300 is described in the context of position estimation, it will be appreciated that process 300 may be applied to obtain other types of navigation information by compressed sensing.

For example, in addition to navigation information that may be obtained from position estimates such as path of travel and/or state of motion, signals representative of inertial measurements obtained from inertial sensors residing on-board a navigation enabled device may likewise be processed by application of compressed sensing. Such signals representative of inertial sensor measurements may be used in addition to or as an alternative to positioning signals to obtain estimates of position, path of travel, and/or state of motion of a device, and additionally to obtain estimates of orientation (e.g., roll, pitch, and/or yaw) of the device. As such, compressed sensing techniques described herein may be applied to other signals beyond positioning signals received from a navigation system.

At 310, one or more positioning signals may be received from a navigation system. For example, in the context of network environment 100, a positioning signal may be received from navigation system 112 by signal receiving subsystem 120 of navigation enabled device 110. In some implementations, a positioning signal received at operation 310 may comprise one or more of a plurality of positioning signals that are sequentially received at the navigation enabled device over a period of time. Such positioning signals may be time stamped in accordance with a relative time at which the positioning signals are received at a receiver. Time stamping of the positioning signals or the resulting compressed samplings that are obtained from such positioning signals may enable position information indicated by the positioning signals to be used to estimate a path of travel of a navigation enabled device over a period of time.

Such positioning signals may comprise wireless signals in at least some implementations. Furthermore, in at least some implementations, positioning signals received at 310 may comprise sparse signals. Sparse signals may refer to signals that contain at least some and often many coefficients that have a value that is close to or equal to zero, when represented in at least some domain. For example, positioning signals may be characterized as sparse in code, code phase, and frequency offset domains in at least some implementations. As one example, with some satellite based navigation systems there may be fewer than twelve space vehicles (e.g., satellites) in view of a receiver at a particular position and time. A positioning signal received from a transmitter of the navigation system, whether space or terrestrial based, may form a "peak" if correlated with a locally generated signal. For example, where a position of a receiver may be obtained from positioning signals received from at least four (4) transmitters, the positioning signal may refer to a space that is 4-sparse.

At 312, the one or more positioning signals may be sampled to obtain a compressed sampling. In at least some implementations, a positioning signal may be sampled according to a sub-Nyquist sampling rate to obtain a compressed sampling. A sub-Nyquist sampling rate may refer to a sampling rate that is less than a Nyquist sampling rate for the given signal being sampled. For example, a Nyquist sampling rate may be defined as twice the bandwidth of a band limited positioning signal.

Furthermore, in at least some implementation, the compressed sampling may comprise a random selection of discrete samples obtained from a positioning signal. Such random sampling of positioning signals may reduce the likelihood that periodically occurring components of the sampled signal are omitted from the compressed sampling. For example, some non-random sampling rates may have a sampling frequency that is a multiple of a frequency of the signal being sampled, thereby potentially resulting in un-sampled or under-sampled signal components. However, it will be appreciated that in some implementations, compressed samplings may be obtained from positioning signals by utilizing a non-random sampling that is performed at a fixed rate or according to a defined rate function. Such a fixed rate or defined rate function may be specifically adapted to characteristics of the particular positioning signals being sampled to avoid or reduce the occurrence of un-sampled or under-sampled signal components in the resulting compressed sampling. Obtaining a compressed sampling according to a random, fixed rate, or defined rate function may be performed according to a corresponding compressed sampling algorithm associated with the compressed sensing module.

Furthermore, such positioning signals which may be sparse in a particular domain (e.g., in code, code phase, and/or frequency offset domains) may be represented by a compressed sampling having a number of discrete samples (m) that is considerably less than a number of discrete samples (n) otherwise utilized for obtaining a Nyquist sampling rate. In particular, a number of discrete samples of a compressed sampling may be represented by the following equation:

$$m \geq C \cdot \mu^2(\text{phi}, \text{psi}) \cdot S \cdot \log n$$

Where C is a constant, µ(phi, psi) is a correlation coefficient that may be related to sampling and basis functions, S is a sparsity of the data represented by the positioning signal, and n is a dimensionality of the data. In this context, n is representative of a number of discrete samples that may be taken at the Nyquist sampling rate, which is the equivalent of the product of the Nyquist sampling rate and the duration of the sampling process. In some implementations, C may be defined as being between 3.0 and 5.0; however, it will be appreciated that other suitable values for constant C may be used. Coefficient S may be defined as being equal to a number of transmitters from which the sampled positioning signal is received. For example, where a positioning signal is received by navigation enabled device as a combination of signal transmissions from at least four transmitters, the positioning signal may refer to a space that is 4-sparse. Hence, coefficient S may be equal to 4.0 in this particular example for a 4-sparse positioning signal.

As a non-limiting example, to capture 80 milliseconds of GPS signal data using compressed sensing, which may be Nyquist sampled at a rate of 2 MHz, a compressed sampling may comprise as few as 104 discrete samples as compared with 160,000 discrete samples using the Nyquist criteria. This example assumes $\mu^2(phi,psi)=1$ (as a minimal value), C=5, and S=4 (a minimal number of satellites for some GPS based navigation systems). These 104 discrete samples of the example compressed sampling at 6 bits for in-phase and quadrature (I & Q) components may be expressed as 156 bytes of information. For example, where 6 bits of information are obtained for the in-phase component and 6 bits of information are obtained for the quadrature component, a total of 12 bits are obtained for each discrete sample. Hence, where a compressed sampling comprises 104 discrete samples, the total size of the data would be equal to 156 bytes of information. However, in at least some implementations, additional information such as coarse time and position estimates may be associated with the compressed sampling as described in greater detail with reference to operation 314. Accordingly, a compressed sampling may have a data size that is larger than the 156 bytes of information of the above example. However, compressed samplings obtained from positioning signals at a sub-Nyquist sampling rate may still have substantially smaller data sizes than Nyquist rate sampled positioning signals, even if additional information such as coarse time or position estimates are associated with the compressed samplings. Such a reduction in data size enables a compressed sampling to be transmitted between a navigation enabled device and a remote computing resource with less network burden and enables compressed samplings to be associated with media content items for purposes of geotagging without substantially increasing a data size of the media content item. Such a reduction in data size may also enable a storage capacity of a storage medium such as a circular buffer for storing such compressed samples to be reduced in size and/or a sampling period of such compressed samples to be increased in duration relative to Nyquist or greater than Nyquist rate samplings for a given storage medium capacity.

At 314, information may be associated with the compressed sampling obtained at 312 to aid in reconstruction of positioning signals from the compressed sampling. Such information may include a coarse time estimate indicating a time at which the positioning signal of that compressed sampling was received at the navigation enabled device and/or a time at which the positioning signal was processed to obtain the compressed sampling. The coarse time estimate may therefore serve as a timestamp for the compressed sampling. Such information may further include a coarse position estimate indicating one or more position estimates obtained, for example, from positioning signals received closely in time to the positioning signal of the compressed sampling (e.g., as indicated by the associated coarse time estimates). As a non-limiting example, a coarse position estimate may indicate one or more longitude and/or latitude values. In at least some implementations, the above described information may be associated with a compressed sampling by appending the information to the compressed sampling itself or by storing the information in association with the compressed sampling (e.g., at operation 316).

Coarse position estimates may be used in some implementations to further limit the domain of possible solutions for reconstructing a positioning signal from a compressed sampling. For example, in the optimization problem described in greater detail with reference to operation 318 of FIG. 3 for reconstructing positioning signals from compressed samplings, an absolute minimum of a particular search domain may be located more rapidly and more easily distinguished from local minimums by using course position estimates from one or more previous locations of the navigation enabled device in combination with the compressed sampling used to reconstruct positioning signals. In this way, computation time associated with the reconstruction process may be reduced and/or the accuracy of the reconstructed positioning signal from the sample may be increased by applying coarse position estimates to the reconstruction process.

At 316, the compressed sampling obtained at 312 may be stored. Where the compressed sampling is to be associated with other information such as coarse position and/or coarse time estimates at operation 314, the compressed sampling may be stored in association with such information. In the context of network environment 100 of FIG. 1, a compressed sampling may be stored at data store 130 of storage media 126 of navigation enabled device 110 and/or at storage media 154 of remote computing resource 150. In some implementations, the compressed sampling may also be stored in association with a media content item. For example, as will be described in greater detail with reference to process 400 of FIG. 4, a compressed sampling may be utilized in a geotagging context to associate position indicating data with a media content item such as an image file, a video file, an audio file, or a text file.

At 318, reconstruction of the positioning signal from the compressed sampling obtained at 312 may be initiated to obtain navigation information such as an estimate of a position of a receiver, for example, of a navigation enabled device. Reconstruction of a positioning signal from a compressed sampling may be performed by application of a reconstruction algorithm by a computing platform such as a navigation enabled device or a remote computing resource.

As one example, consider a real valued, finite length, discrete-time signal x. Signal x may be represented as a vector x in $R^N$ of dimensions N×1 in terms of an orthonormal basis $\Psi$, $x=\Psi\alpha$. R in this context comprises a set of real numbers and $R^N$ comprises the set of vectors of length N having each element in the real numbers of set R. Here, x is considered S-sparse if $\alpha$-sub(N×1) has at most S non-zero components and $\Psi$-sub(N×N) is an orthogonal basis. Signal x is considered nearly S-sparse if $\alpha$-sub(N×1) has S large coefficients and the remaining N-S are small but not equal to zero.

Compressed sensing may involve sampling x according to a sampling process $\Phi$, where:

$$Y\text{-sub}(M \times 1) = \Phi\text{-sub}(M \times N) x\text{-sub}(N \times 1)$$

The reconstruction problem in this context is to reconstruct x* from y such that:

$$\|x - x^*\|\text{-sub}(L2) < \epsilon$$

With expansion: $y = \Phi x = \Phi \Psi \alpha$.

The optimization problem to be solved is to solve for the vector a that satisfies the above equation with minimal L1 norm, where a is a member of $R^N$. Accordingly, the minimization problem in this example is to minimize L1 norm of $\alpha$ over all $\alpha$ in R^N such that y=$\Phi\Psi\alpha$. Specifically, $$\text{Min}(\alpha \in R^N) \|\alpha\| L1 \text{ s.t. } y = \Phi\Psi\alpha.$$

The L1 norm minimization problem can be recast in the standard form of a linear program for which efficient algorithms exist, namely:

$$\text{Min}(\alpha) \|\alpha\| L1 \text{ s.t. } y = A\alpha.$$

And, in the linear programming form:

$$\text{Min}(cTx) \text{ s.t. } Bx = y, x > 0.$$

In at least some implementations, the above equation may be solved through a computational search of the space (e.g., a brute-force search). However, a computational search approach may be impractical for most real problems as the size of the space may be sufficiently large. Therefore, numerous reconstruction algorithms have been developed to more efficiently solve this type of linear programming problem beyond merely a computational search approach. Such reconstruction algorithms may utilize an efficient approximation approach that that solves a minimization problem which seeks to minimize (or considerably reduce below a threshold value) one or more of search time and/or solution error. Non-limiting examples of reconstruction algorithms (alternatively referred to as recovery algorithms) employing an efficient approximation approach include: matching pursuit (including regularized orthogonal matching pursuit), gradient pursuit, iterative thresholding, and affine scaling transformation algorithms, among others.

In at least some implementations, reconstruction of a positioning signal from a compressed sampling may be performed at the navigation enabled device that initially received the positioning signal. For example, in the context of network environment 100 of FIG. 1, reconstruction of the positioning signal from the compressed sampling may be performed by signal processing subsystem 122 of navigation enabled device 110.

In other implementations, reconstruction of a positioning from a compressed sampling may be performed, at least in part, at a remote computing resource. For example, in the context of network environment 100 of FIG. 1, navigation enabled device 110 may initiate transmission of the compressed sampling to remote computing resource 150 for reconstruction of the positioning signal. Remote computing resource 150 may then reconstruct the positioning signal from the compressed sampling obtained from navigation enabled device 110 to obtain navigation information such as an estimate of a position of the navigation enabled device. In at least some implementations, such navigation information may be transmitted back to the navigation enabled device or may be provided to other suitable computing resources or processes relying on the navigation information.

FIG. 4 is a flow diagram illustrating an example process 400 for associating a compressed sampling with a media content item according to one implementation. In at least some implementations, process 400 may be performed, for example, at a navigation enabled device (e.g., navigation enabled device 110) and/or other suitable computing platform (e.g., remote computing resource 150) by one or more processors executing instructions.

At 410, capture of a media content item may be initiated at a navigation enabled device such as navigation enabled device 110. As previously described with respect to navigation enabled device 110, media capture device 136 may include, for example, a camera, an audio microphone, a keypad, etc. Accordingly, a media content item captured at operation 410 may include, for example, video content, image content, audio content, textual content, etc. In at least some implementations, capture of a media content item may be initiated responsive to receiving a user input at the navigation enabled device, for example, via an input device. As one example, a user input for initiating capture of a media content item such as an image or a video may be received as a user activating a shutter release button for a camera of the navigation enabled device. As another example, a user input for initiating capture of a media content item may be received as a user launching a software application such as a media capture application at the navigation enabled device.

At 412, sampling of a positioning signal may be initiated to obtain a compressed sampling responsive to initiating capture of a media content item at operation 410. For example, a signal processing subsystem of a navigation enabled device (e.g., signal processing subsystem 122) may be adapted to receive an indicator signal from a media capture device (e.g., media capture device136) that indicates that a media content item has been captured, is anticipated to be captured (e.g., as indicated by launching of a software application for capturing a media content item), or is currently being captured by the media capture device. The indicator signal may be generated by the media capture device, for example, responsive to receiving a user input for initiating capture of a media content item.

At 414, the compressed sampling may be associated with the media content item. As one example, associating the compressed sampling with the media content item comprises appending the compressed sampling to the media content item as a digital tag. As another example, associating the compressed sampling with the media content item comprises storing the compressed sampling as metadata of the media content item. As yet another example, a compressed sampling identifier may be associated with the media content item (e.g., as metadata or a digital tag) which may be referenced by the navigation enabled device or a remote computing resource to retrieve a compressed sampling from a storage medium that corresponds to the compressed sampling identifier.

At 416, transmission may be initiated of the media content item and associated compressed sampling to a remote computing resource for reconstruction of the positioning signal. For example, in the context of computing environment 100 of FIG. 1, a compressed sampling may be transmitted from navigation enabled device 110 to remote computing resource 150 as metadata or a digital tag of a media content item with which the compressed sampling is associated. As another example, where a compressed sampling identifier is instead associated with the media content item, the compressed sampling and the media content item may be separately transmitted to the remote computing resource.

At 418, reconstruction of the positioning signal from the compressed sampling may be performed at the remote computing resource to obtain the position information or other navigation information indicated by the positioning signals.

At 420, the estimate of the position or other navigation information obtained from reconstruction of the positioning signal from the compressed sampling may be associated with the media content item. Such navigation information may be interpreted by a media presentation application to reference navigation information with presentation of a media content item at a computing platform.

Figure 5:
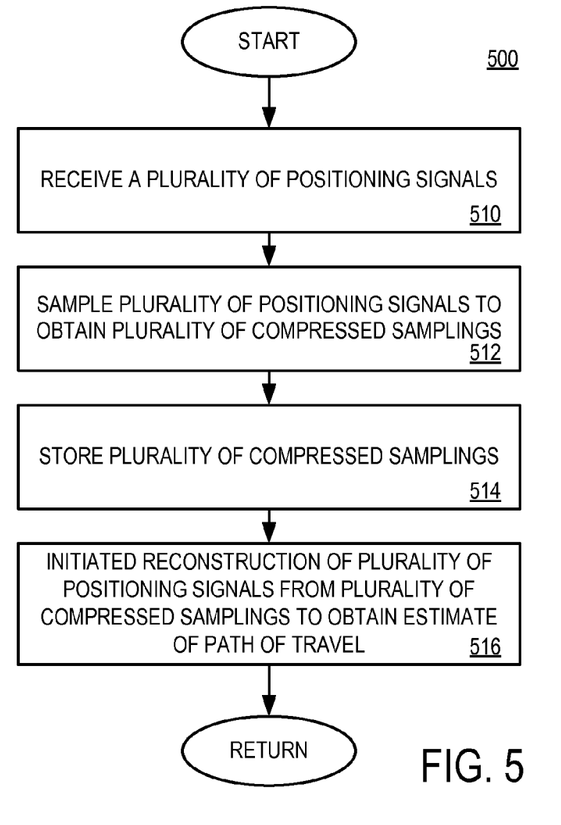
FIG. 5 is a flow diagram illustrating an example process for obtaining an estimate of a path of travel of a navigation enabled device according to one implementation.

FIG. 5 is a flow diagram illustrating an example process 500 for obtaining an estimate of a path of travel of a navigation enabled device according to one implementation. In at least some implementations, process 500 may be performed, for example, at a navigation enabled device (e.g., navigation enabled device 110) and/or other suitable computing platform (e.g., remote computing resource 150) by one or more processors executing instructions.

At 510, a plurality of positioning signals may be received from a navigation system. For example, as previously described at operation 310 of FIG. 3, a positioning signal may be received at a navigation enabled device from one or more transmitters of a navigation system. In the context of operation 510, the positioning signal may comprise one of a plurality of positioning signals received at a navigation enabled device (e.g., sequentially and/or in parallel) over a time period.

At 512, the plurality of positioning signals may be sampled to obtain a plurality of compressed samplings. For example, operation 512 may include sampling the plurality of received positioning signals according to one or more sub-Nyquist sampling rates over a time period to obtain a plurality of compressed samplings.

At 514, the plurality of compressed samplings may be stored. For example, operation 514 may include sequentially storing the plurality of compressed samplings in a circular buffer (e.g., at data store 130 of navigation enabled device 110). As previously discussed, such compressed samplings may be of a smaller data size than Nyquist or greater than Nyquist rate samplings to enable a reduction in a storage capacity (e.g., size) of the circular buffer, storage of a greater number of compressed samplings, and/or storage of compressed samplings having a longer sampling duration than such Nyquist rate samplings.

At 516, reconstruction may be initiated of the positioning signals from the plurality of compressed samplings to obtain an estimate of a path of travel of the navigation enabled device. As previously described with reference to operation 318, reconstruction may be performed using any suitable algorithm to obtain position information. Such position information obtained from two or more positioning signals received over a period of time may be assembled to provide an estimate of the path of travel.

Figure 6:
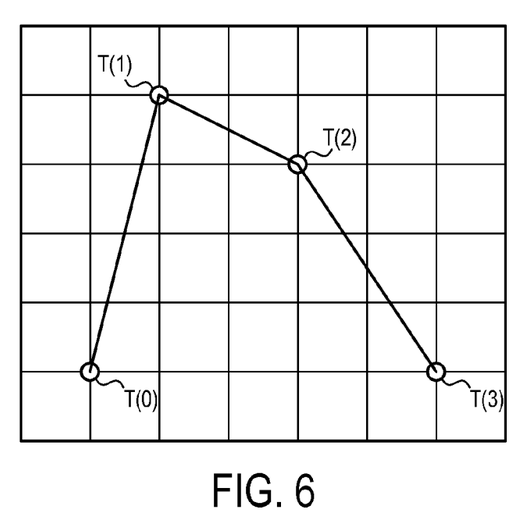
FIG. 6 is a diagram illustrating an example path of travel of a navigation enabled device.

In at least some implementations, received positioning signals and/or compressed samplings obtained from such positioning signals may be time stamped to enable a path of travel to be assembled. For example, FIG. 6 is a diagram illustrating an example path of travel of a navigation enabled device. An initial position of the navigation enabled device may be estimated from a compressed sampling obtained for a corresponding time T(0). At a later time T(1), an estimated position of the navigation enabled device may be obtained from a subsequently obtained compressed sampling. At still later times T(2) and T(3), estimated positions of the navigation enabled device may be obtained from other compressed samplings that are obtained from received positioning signals. Hence, the estimated positions obtained at times T(0) through T(3) may be used to indicate a path of travel of the navigation enabled device over a given time period.

Once a position of a navigation enabled device has been estimated (e.g., for time T(0)), that position may be used to aid in the reconstruction of positioning signals from other compressed samplings (e.g., for time T(1)). For example, a coarse position estimate associated with a compressed sampling may be used to aid in reconstructing a positioning signal from that compressed sampling. Combining two or more compressed samplings may improve the accuracy of position estimation and/or reduce computation time associated with reconstruction of a positioning signal from a compressed sampling by reducing a size of a domain that is searched in the above described optimization problem.

Additionally, it will be appreciated that velocity and/or acceleration information may be obtained from two or more estimated positions by computing, for example, a distance travelled by the navigation enabled device between the two or more estimated positions within a known period of time between receiving and/or processing of the corresponding positioning signals.

Figure 7:
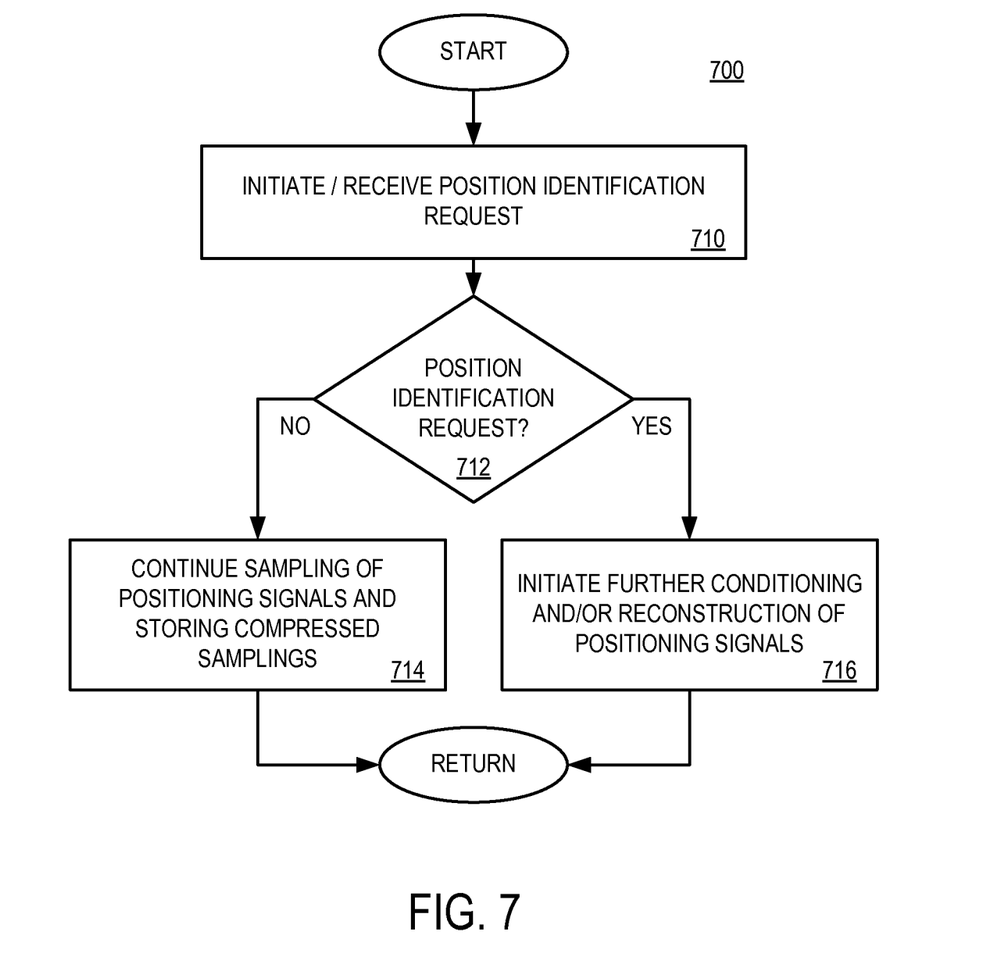
FIG. 7 is a flow diagram illustrating an example process for initiating processing of a compressed sampling according to one implementation.

FIG. 7 is a flow diagram illustrating an example process 700 for initiating processing of a compressed sampling according to one implementation. In at least some implementations, process 700 may be performed, for example, at a navigation enabled device (e.g., navigation enabled device 110) and/or other suitable computing platform (e.g., remote computing resource 150) by one or more processors executing instructions. Process 700 may be utilized to initiate processing of previously stored compressed samplings responsive to position identification requests. By delaying reconstruction of positioning signals from compressed samplings until navigation information is requested (e.g., by a user, computing platform, software application, etc.), processing resources otherwise dedicated to reconstruction of positioning signals from compressed samplings may be conserved and/or utilized for other purposes. For example, a user may choose to interact with or may delete media content items that are captured at a navigation enabled device without using or referencing navigation information indicated by the compressed samplings associated with those media content items.

At 710, a position identification request may be initiated. In at least some implementations, operation 710 may be performed by a navigation enabled device by initiating a position identification request responsive to receiving a user initiated request to obtain navigation information (e.g., a position of the navigation enabled device). For example, navigation enabled device 110 may receive a user initiated request via input device 132 and in response initiate a position identification request.

As another example, a user initiated request may include a user initiating loading of a media content item for presentation at a navigation enabled device. Navigation enabled device 110 may include, for example, one or more software applications (e.g., stored as instructions 128) for facilitating presentation of media content items at the navigation enabled device or other computing platform. Non-limiting examples of such software applications include a video player application, an image viewer application, an audio player application, a text viewer or editor application, etc. In response to receiving a user initiated request to present a media content item, a position identification request may be initiated to obtain position information or other navigation information associated with the media content item. Such software applications may be adapted to initiate a position identification request on behalf of the user (e.g., responsive to a request to reference navigation information associated with a media content item). In at least some implementations, an operating system of the navigation enabled device or other suitable computing platform may be adapted to receive position identification requests from software applications via an application programming interface (API) and initiate reconstruction of positioning signals from compressed samplings in response thereto.

Furthermore, in at least some implementations, a position identification request may be initiated according to a position update time interval. For example, a navigation enabled device may be programmed to initiate reconstruction of positioning signals from compressed samplings according to a predetermined processing schedule. As a non-limiting example, a position identification request may be initiated at a particular time interval (e.g., every 30 seconds or other suitable time interval) to obtain position updates from compressed samplings. Such compressed samplings may be retrieved from a storage media or may be sampled in real-time from positioning signals received at a navigation enabled device.

At 712, if a position identification request has not been initiated and/or received, then a first mode may be performed whereby compressed samplings may continue to be obtained from received positioning signals, and stored at 714. Alternatively, at 712, if a position identification request has been initiated and/or received, then a second mode may be performed whereby further conditioning and/or reconstruction of a positioning signal from a compressed sampling may be initiated at 716. Hence, operation may be varied between a first mode and a second mode of operation responsive to whether a position identification request has been initiated and/or received. However, in at least some implementations, sampling and/or storage of compressed samplings may continue to be performed in parallel with further conditioning and/or reconstruction of positioning signals from compressed samplings at operation 716.

Furthermore, in at least some implementations, a select compressed sampling of a plurality of compressed samplings may be retrieved from a storage media (e.g., a circular buffer) responsive to obtaining a position identification request. The select compressed sampling may correspond to a previously received positioning signal. In at least some implementations, the select compressed sampling may comprise a most recently obtained compressed sampling (e.g., the last compressed sampling to be stored at the storage media) to thereby obtain a position fix for the navigation enabled device corresponding to a most recently measured position. Accordingly, a positioning signal may be reconstructed from the select compressed sampling to identify navigation information indicated by the corresponding previously received positioning signal. Hence, position identification requests may be utilized to estimate a position of a navigation enabled device at any time in the past for which a compressed sampling has been obtained and stored.

Position determination techniques described herein may be implemented in conjunction with various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

The methodologies described herein may be implemented in different ways and with different configurations depending upon the particular application. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

The herein described storage media may comprise primary, secondary, and/or tertiary storage media. Primary storage media may include memory such as random access memory and/or read-only memory, for example. Secondary storage media may include mass storage such as a magnetic or solid state hard drive. Tertiary storage media may include removable storage media such as a magnetic or optical disk, a magnetic tape, a solid state storage device, etc. In certain implementations, the storage media or portions thereof may be operatively receptive of, or otherwise configurable to couple to, other components of a computing platform, such as a processor.

In at least some implementations, one or more portions of the herein described storage media may store signals representative of data and/or information as expressed by a particular state of the storage media. For example, an electronic signal representative of data and/or information may be "stored" in a portion of the storage media (e.g., memory) by affecting or changing the state of such portions of the storage media to represent data and/or information as binary information (e.g., ones and zeros). As such, in a particular implementation, such a change of state of the portion of the storage media to store a signal representative of data and/or information constitutes a transformation of storage media to a different state or thing.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels.

Unless specifically stated otherwise, as apparent from the following discussion, it is appreciated that throughout this specification discussions utilizing terms such as "processing," "computing," "calculating,", "identifying", "determining", "establishing", "obtaining", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in some implementations" or other like phrases in various places throughout this specification are not necessarily all referring to the same feature, example, and/or limitation. Furthermore, the particular features, structures, or characteristics may be combined in one or more examples and/or features.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of appended claims, and equivalents thereof.

What is claimed is:

1. A method, comprising:
    sampling a positioning signal received at a receiver according to a sub-Nyquist sampling rate lower than a Nyquist sample rate for the positioning signal to obtain a compressed sampling, the positioning signal capable of being reconstructed from the compressed sampling to obtain an estimate of a position of the receiver; and
    wherein within a given time period, the sub-Nyquist sampling rate corresponds to m number of samples and the Nyquist sampling rate corresponds n number of samples, m being proportional to log(n); and
    storing the compressed sampling at a storage medium.

2. The method of claim 1, wherein storing the compressed sampling comprises associating the compressed sampling with a media content item.

3. The method of claim 2, further comprising:
    initiating capture of the media content item at the receiver; and
    initiating said sampling of the positioning signal responsive to said initiating capture of the media content item.

4. The method of claim 2, wherein associating the compressed sampling with the media content item comprises appending the compressed sampling to the media content item as a digital tag.

5. The method of claim 2, wherein associating the compressed sampling with the media content item comprises storing the compressed sampling as metadata of the media content item.

6. The method of claim 2, further comprising:
    initiating transmission of the media content item and the associated compressed sampling to a remote computing resource for reconstruction of the positioning signal.

7. The method of claim 1, further comprising:
    initiating reconstruction of the positioning signal from the compressed sampling at the receiver to obtain the estimate of the position of the receiver.

8. The method of claim 1, further comprising:
    initiating reconstruction of the positioning signal from the compressed sampling at a remote computing resource to obtain the estimate of the position of the receiver by transmitting said compressed sampling to said remote computing resource via a communication network.

9. The method of claim 1, wherein the received positioning signal comprises a sparse signal.

10. The method of claim 1, wherein the compressed sampling comprises a random sampling of the positioning signal received at the receiver.

11. The method of claim 1, wherein the positioning signal is one of a plurality of positioning signals received at the receiver; and
    wherein the method further comprises:
        sampling the plurality of received positioning signals according to one or more sub-Nyquist sampling rates to obtain a plurality of compressed samplings; and
        storing the plurality of compressed samplings at the storage medium.

12. The method of claim 11, further comprising:
    reconstructing the plurality of received positioning signals from the plurality of compressed samplings to obtain an estimate of a path of travel of the receiver over a time period.

13. The method of claim 11, wherein storing the plurality of compressed samplings comprises sequentially storing the plurality of compressed samplings in a circular buffer of the storage medium; and
    wherein the method further comprises:
        retrieving a select compressed sampling of the plurality of compressed samplings from the circular buffer responsive to obtaining a position identification request, the select compressed sampling corresponding to a previously received positioning signal of the plurality of positioning signals; and
        reconstructing the previously received positioning signal from the select compressed sampling to identify a position of the receiver indicated by the previously received positioning signal.

14. An apparatus, comprising:
a navigation enabled device, comprising:
- a receiver to receive one or more positioning signals;
- a storage medium for storing data; and
- a processor to:
  - obtain a compressed sampling of a positioning signal received at the receiver according to a sub-Nyquist sampling rate lower than a Nyquist sample rate for the positioning signal, the positioning signal capable of being reconstructed from the compressed sampling to obtain an estimate of a position of the navigation enabled device;
  - wherein within a given time period, the sub-Nyquist sampling rate corresponds to m number of samples and the Nyquist sampling rate corresponds n number of samples, m being proportional to log(n); and
  - store the compressed sampling at the storage medium.

15. The apparatus of claim 14, further comprising an analog to digital converter to convert an analog state of the positioning signal received at the receiver to a digital signal comprising the compressed sampling.

16. The apparatus of claim 14, further comprising:
- a media capture device to capture one or more media content items;
- wherein the processor is further programmed to associate the compressed sampling with a media content item captured via the media capture device.

17. The apparatus of claim 16, wherein the media capture device includes one or more of a camera, a microphone, and/or a keypad; and
- wherein the media content item includes one or more of an image, a video, an audio recording, and/or textual content.

18. The apparatus of claim 16, wherein the processor is further programmed to:
- initiate transmission of the media content item and the associated compressed sampling to a remote computing resource for reconstruction of the positioning signal.

19. The apparatus of claim 14, wherein the positioning signal received at the receiver comprises a sparse signal; and
- wherein the processor is further programmed to randomly sample the positioning signal to obtain the compressed sampling.

20. An apparatus, comprising:
a storage medium having instructions stored thereon that are executable by a processor to:
- sample a positioning signal according to a sub-Nyquist sampling rate lower than a Nyquist sample rate for the positioning signal to obtain a compressed sampling, the positioning signal capable of being reconstructed from the compressed sampling to obtain an estimate of a geographic location represented by the positioning signal;
- wherein within a given time period, the sub-Nyquist sampling rate corresponds to m number of samples and the Nyquist sampling rate corresponds n number of samples, m being proportional to log(n); and
- store the compressed sampling at the storage medium.

21. An apparatus, comprising:
- means for sampling a positioning signal according to a sub-Nyquist sampling rate lower than a Nyquist sample rate for the positioning signal to obtain a compressed sampling;
- wherein within a given time period, the sub-Nyquist sampling rate corresponds to m number of samples and the Nyquist sampling rate corresponds n number of samples, m being proportional to log(n); and
- means for initiating reconstruction of the positioning signal from the compressed sampling to obtain an estimate of a geographic location represented by the positioning signal.

22. The apparatus of claim 21, wherein said means for initiating reconstruction of the positioning signal from the compressed sampling comprises:
- means for transmitting the compressed sampling to a remote computing resource capable of reconstructing the positioning signal from the compressed sampling to obtain the estimate of the geographic location.

23. The apparatus of claim 22, further comprising:
- means for associating the compressed sampling with a media content item as a compressed sampling component of the media content item; and
- wherein the means for transmitting the compressed sampling to the remote computing resource further comprises means for transmitting the media content item comprising the compressed sampling component.

24. The apparatus of claim 14, wherein the processor is further programmed to:
- initiate the position identification request according to a position update time interval.

25. The apparatus of claim 14, wherein the processor is further programmed to:
- initiate the position identification request responsive to receiving a user initiated request to obtain the estimate of the position of the navigation enabled device.

26. The apparatus of claim 20, wherein the instructions are further executable by the processor to:
- initiate the position identification request according to a position update time interval.

27. The apparatus of claim 20, wherein the instructions are further executable by the processor to:
- initiate the position identification request responsive to receiving a user initiated request to obtain the estimate of the geographic location.

28. The apparatus of claim 21, further comprising means for:
- initiating the position identification request according to a position update time interval.

29. The apparatus of claim 21, further comprising means for:
- initiating the position identification request responsive to receiving a user initiated request to obtain the estimate of the geographic location.

30. The method of claim 1, wherein said sampling the position signal and said storing the compressed sampling are performed at least during a first mode, and wherein the method further comprises:
- during a second mode, processing the stored compressed sampling by initiating reconstruction of the positioning signal from the compressed sampling to obtain the estimate of the position of the receiver; and
- varying operation between the first mode and the second mode responsive to a position identification request.

31. The apparatus of claim 14, wherein the processor is further programmed to:
- initiate reconstruction of the positioning signal from the compressed sampling at the processor to obtain the estimate of the position of the navigation enabled device.

32. The apparatus of claim 20, wherein the instructions are further executable by the processor to:
- initiate reconstruction of the positioning signal from the compressed sampling to obtain the estimate of the geographic location.

33. An apparatus comprising:

a processor to execute instructions; and a storage medium having instructions stored thereon that are executable by the processor to:

obtain via a communication network, a media content item having a media component and a compressed sampling component, the compressed sampling component comprising a sub-Nyquist sampling of one or more positioning signals indicating a geographic location, the sub-Nyquist sampling obtained according to a sub-Nyquist sampling rate lower than a Nyquist sampling rate for the one or more positioning signals;

wherein within a given time period, the sub-Nyquist sampling rate corresponds to m number of samples and the Nyquist sampling rate corresponds n number of samples, m being proportional to log(n);

process the compressed sampling component to obtain the geographic location;

and store the geographic location in association with the media component.

34. The apparatus of claim 33, wherein the compressed sampling component comprises a random sub-Nyquist sampling of the one or more positioning signals; and wherein the media component comprises one or more of an image, a video, or an audio recording.

35. The apparatus of claim 33, wherein the instructions are further executable by the processor to:

obtain a plurality of sub-Nyquist samplings of a plurality of positioning signals indicating a plurality of different geographic locations; and reconstruct the plurality of positioning signals from the plurality of sub-Nyquist samplings to obtain an estimate of a path of travel defined, at least in part, by the different geographic locations indicated by the plurality of positioning signals.

36. A method, comprising:

obtain via a communication network, a media content item having a media component and a compressed sampling component, the compressed sampling component comprising a sub-Nyquist sampling of one or more positioning signals indicating a geographic location, the sub-Nyquist sampling obtained according to a sub-Nyquist sampling rate lower than a Nyquist sampling rate for the one or more positioning signals;

wherein within a given time period, the sub-Nyquist sampling rate corresponds to m number of samples and the Nyquist sampling rate corresponds n number of samples, m being proportional to log(n);

process the compressed sampling component to obtain the geographic location; and store the geographic location in association with the media component.

37. The method of claim 36, further comprising:

transmitting an indication of the geographic location obtained from the processed compressed sampling component to a navigation enabled device via a communication network.

38. The method of claim 30, further comprising:

initiating the position identification request according to a position update time interval.

39. The method of claim 30, further comprising:

initiating the position identification request responsive to receiving a user initiated request to obtain the estimate of the position of the receiver.

40. The method of claim 30, further comprising:

associating the estimate of the position of the receiver with a media content item.

41. The apparatus of claim 32, wherein to initiate reconstruction of the positioning signal from the compressed sampling, the instructions are further executable by the processor to:

initiate transmission of the compressed sampling to a remote computing resource via a communication network, wherein the remote computing resource is capable of reconstructing the positioning signal from the compressed sampling to obtain the estimate of the geographic location.

42. The apparatus of claim 41, wherein to store the compressed sampling, the instructions are further executable by the processor to:

associate the compressed sampling with a media content item; and wherein the instructions are further executable by the processor to initiate transmission of the media content item to the remote computing resource with the associated compressed sampling.

* * * * *